March 27, 1928.

J. H. GRAVELL 1,664,030

METHOD OF AND APPARATUS FOR ELECTRIC RESISTANCE WELDING

Filed March 23, 1926

Inventor
James Harvey Gravell
By his Attorneys
Townsend + Decker

Patented Mar. 27, 1928.

1,664,030

UNITED STATES PATENT OFFICE.

JAMES HARVEY GRAVELL, OF ELKINS PARK, PENNSYLVANIA.

METHOD OF AND APPARATUS FOR ELECTRIC-RESISTANCE WELDING.

Application filed March 23, 1926. Serial No. 96,684.

This invention relates to that type of welding wherein the heat thereof is developed directly in the work to be welded by the resistance of the work to the passage of an electric current.

The invention is especially useful for electric resistance welding by methods and apparatus in which pointed electrodes, buttons, rollers, etc. are employed for localizing the welding.

Heretofore difficulties have been encountered in heavy duty spot welding and seam welding and in all forms of welding where large volumes of current have been localized by means of electrodes. Also in the case of large work difficulty has been encountered from the fact that in previous methods the work circuit or current has necessarily encircled the work in order that it may be applied at the desired point of welding and therefore the work current circuit has been subjected in many cases to a prohibitive amount of self-induction from the work.

Furthermore, in order to properly localize the current, specially shaped copper electrodes have been provided which not only supply the current but also act as pressure devices for forcing the parts to be welded together. As copper is a soft metal and as great pressure must be exerted by these copper electrodes, and as the current passing through the electrodes causes them to heat and thereby lose the small amount of rigidity they possess, they soon mushroom and become worthless for the purpose intended.

One of the objects of this invention is to overcome the latter difficulty by reducing the amount of current flowing through any one electrode without reducing the volume of current flowing through the part to be welded; to reduce the counter-electromotive force generated in the welding current or circuit by the work, to simplify the heating circuit so that the throat of the welding apparatus is eliminated; to provide a throatless apparatus, thus allowing any size work to be welded on the same machine, to extend the limitations of welding, to produce better and stronger welds, and to facilitate welding so that many structural shapes and heavy parts may be brought within the category of weldable products, and to attain other advantages which will be apparent to those skilled in the art.

Generally stated, the invention consists in passing the parts to be welded between opposite poles of two independent welding circuits, said poles or electrodes constituting the welding vise or pressure device and arranged more or less closely in direct line with one another to properly apply the pressure, said working circuits or currents cooperating to heat the work in such manner that the current of one circuit only passes through one of said pressure electrodes and the current of the other through the other electrode while the current of both passes over the work itself or the elements thereof and in a line coinciding with the line of pressure.

The invention consists further in the details of the process and apparatus as hereinafter more particularly described and claimed.

Figure 1:
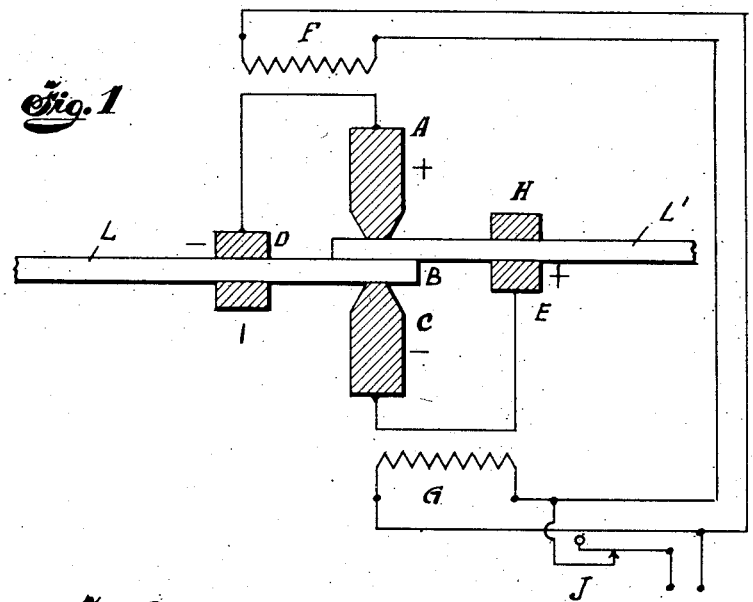
Fig. 1 illustrates my invention in diagrammatic fashion as applied to the making of a spot weld by pointed electrodes.

In the drawings A indicates one welding electrode and C the opposite electrode. B indicates the point of application of the currents and of the welding to be effected in an overlapped portion of two plates or work members L L'. D indicates a platen contact electrode or terminal for one welding or work current and E a similar contact electrode for the other welding current or circuit. Said electrodes D and E are applied respectively to the elements L L'. H indicates anvils or rests designed to support the work against pressure applied on the contacting electrodes D for the purpose of making good electrical contact with the work. Suitable transformers for the two welding currents are indicated at F G respectively while a suitable switch J controls the application of the welding current.

Referring now to Fig. 1, it is evident that the current flowing from one welding electrode A although passing the joint to be welded B does not enter the opposite welding terminal C but completes the circuit by means of the platen contact electrode D and what is true of circuit A, B, D is also true of the circuit E, B, C. Although these circuits coalesce at the joint B to be welded they do not cross each independent circuit remaining intact and returning to the point of origin which is the transformer F and the transformer G respectively.

As commercially carried out the electrodes A and C constitute the jaws of a welding vise between which the parts to be welded are placed. The contacting electrodes D and E may be made to cover a relatively large area, so that practically no heating effect is produced where they contact with the work. Also the contact electrodes D and E being opposed by anvils H and I may exert considerable pressure on the metal of the work. In other words, a contact electrode and a platen may constitute an auxiliary vise for holding the contact electrode to the work.

The primary circuits actuated and the welding transformers F and G may be connected in parallel or series, provided however the polarities of the heating terminals are such that the two welding currents do not oppose each other. In Fig. 1 the transformers are connected in parallel and operated by a switch shown at J.

Figure 2:
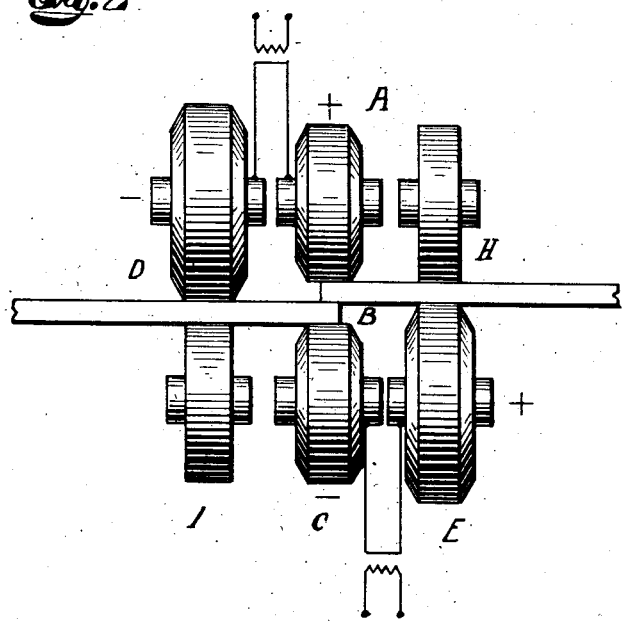
Fig. 2 shows diagrammatically my invention as carried out in the production of a welded seam.

In Fig. 2 is shown an apparatus applying the invention to the production of seam welding where the electrodes and anvils take the form of rolls.

It is evident from the above description that two independent welding circuits are provided, said circuits located respectively wholly on opposite sides of the work, thus eliminating the necessity for the so-called welding throat. As will be seen, the pressure electrodes are electrodes of two independent work circuits but constitute together a welding vise for welding being in substantially direct line with one another or in the line of welding pressure, but the heating current does not pass from one welding electrode to the other through the joint or portion of work operated upon. It is also evident that as both circuits pass through the point to be welded the heating effect at this point is four times as great as any other point in either circuit, due to the fact that there is twice as much current passing through the point to be welded as at any other point in either circuit; thus the same heating effect is produced with one-fourth the amount of current as would be required should the circuit be a simple one where the same volume of current is present at all points in the circuit.

The practice has been heretofore to concentrate the current for welding, especially spot welding, solely by means of the electrodes themselves or by variations of this idea such as the introduction of buttons between the electrodes and the work or by so shaping the work that the current must concentrate itself to get across the joint to be welded, and although these same means may be applied as adjuncts to my process, it is evident from the above description that I concentrate my currents in one by shaping the electrodes, providing buttons or spotting the work, but also by causing two independent currents to coalesce at the spot to be welded, thus employing two means simultaneously by causing my welding currents to be concentrated.

It is well known that two parallel currents attract each other hence it will be seen that in my case the two independent currents will tend to concentrate in the work between the two welding electrodes. Therefore by my invention the losses of heating current due to circulation of current across the work outside of the line of pressure will be greatly diminished.

What I claim as my invention is:

1. The method of heating by causing a number of independent electric currents to coalesce or pass in the same line or path through the spot or section of work to be heated by causing one of said currents to pass through one only of a pair of electrodes engaged with the work in line with said spot or section but at opposite sides thereof and the other current to pass similarly through the other electrode while the current of both is conducted through the work to the point of heat independently of said work engaging electrodes.

2. The method of spot welding consisting in concentrating the current by means of a pair of electrodes and by causing a plurality of independent currents to coalesce and pass in the same line through the point to be welded said line coinciding with the line of pressure exerted by said electrodes, each said current passing through one electrode and through the work independently of the other electrode and exerting pressure by means of the electrodes to complete the weld.

3. An apparatus for welding consisting in a welding vise, the jaws of which are opposed electrodes of two independent circuits carrying currents flowing independently of one another but coalescing in the heated section of work in the same point or line coinciding with the line of pressure exerted by said jaws and the said electrodes being electrically connected respectively through the independent sources of current with work engaging contact blocks for completing each circuit through the work independently of a welding jaw.

4. An apparatus for welding consisting of two independent circuits each supplied with work current and three work engaging contact vises in a row, the jaws of the central vise constituting respectively opposite electrodes of the two independent circuits, while the end vices constitute respectively terminals of said circuits of opposite polarity to that of each jaw of the central vise, the currents of said circuits being passed simultaneously through the part of the work to be heated.

5. In an electric resistance welding apparatus, two work current circuits engaging respectively by opposite poles with opposite sides of the work in the line of welding pressure, said electric circuits each having a remaining pole engaging with the element of the work opposite that engaged by its first-named pole but outside the zone of heating, the heating at the point of electric resistance taking place by the combined effect of the currents in two independent circuits each comprising one heating electrode only, while the current at the point of contact of each electrode in the line of welding pressure on the work is that of one circuit only.

6. The herein described method of electric resistance welding by the application of two work currents or circuits consisting in including the work between two pressure electrodes in line with one another and forming respectively opposite poles of two work current circuits, completing each circuit through two other electrodes forming respectively remaining poles of said circuit and applied to one side of the line of welding pressure, the points of engagement for the two electrodes of each circuit being on the same side of the work, and each said pressure electrode carrying the current of one source of work current only.

7. The method of electric resistance welding by combining in the independent work two work current circuits each located entirely to one side of the work and passing the currents into the work each by a pressure electrode and by an electrode to one side thereof conducting the current into the same side of the work for return to the place of heating directly through an unheated section of the work independently of any pressure electrode.

8. The process of electric spot welding consisting in gripping the parts to be welded between a positive electrode of one electric circuit and a negative electrode of another electric circuit, each said circuit carrying a current independently of the other, and passing the two currents of said circuits uncrossed through the surfaces to be welded in the same line coinciding with the line of pressure of the said electrodes so that the currents of said independent sources will coalesce in said line to heat the same and adjust the gripping pressure to complete the weld.

9. In an electric heating apparatus, means for heating the work by two work current sources flowing in independent circuits through two work engaging heating electrodes, one only for each circuit, pressing on the work in direct line with one another and consisting respectively of poles of said circuits of opposite polarity and means for each circuit independent of the other for conducting the current of each circuit into the work at a point remote from the place of heating, the circuit being completed therefrom to the point of heating independently of a work engaging contact.

10. The method of electric welding consisting in causing two parallel currents from independent sources to coalesce in the same line of pressure at the point to be welded between two opposing pressure devices forming respectively opposite poles of said sources and each circuit including one only of said pressure devices.

11. The method of welding two pieces of metal together consisting in interposing the same between two electrodes forming respectively opposite poles of two independent work circuits and completing each work current circuit by engaging it with the side of the work engaged by the electrode of the other circuit but at a point thereof to one side of the place of welding for completing the circuit of each current by flow through the work to the point of heating independently of a work engaging contact.

12. The herein described improvement in electric welding consisting in passing the currents of separate heating circuits through the section of work to be welded in the same line with the line of pressure of two electrodes engaging the work at opposite sides thereof, each through one of said pressure electrodes and directly to the point or section to be heated through the work on the same side with the opposite electrode and independently thereof.

13. The herein described improvement in electrically welding two plates or pieces of metal together by heat developed at a place of contact between them consisting in supplying the work current from two separate heating sources passing through the work in the same line, said sources supplying their currents to the point of heating independently of one another each by an electrode applying pressure in the line of heating and through a portion of work engaged by an opposite electrode and conducted to the point of heating through said work independently of said opposite electrode.

14. The method of electric heating consisting in pinching the section or point of work to be heated between two pressure electrodes in line with one another and forming respectively opposite electrodes of two separate or independent work current circuits whose currents are passed through the work in the same line or path, each said electrode carrying the current of one circuit only and having its circuit completed through the work to the place of heating independently of the other electrode.

Signed at New York in the county of New York and State of New York this 22nd day of March, A. D. 1926.

JAMES HARVEY GRAVELL.

CERTIFICATE OF CORRECTION.

Patent No. 1,664,030.  Granted March 27, 1928, to

JAMES HARVEY GRAVELL.

It is hereby certified that error appears in the printed specification of the above numbered patent requiring correction as follows: Page 3, line 48, claim 7, strike out the word "independent" and insert the same before the word "work" in line 49; and that the said Letters Patent should be read with this correction therein that the same may conform to the record of the case in the Patent Office.

Signed and sealed this 1st day of May, A. D. 1928.

(Seal)

M. J. Moore,
Acting Commissioner of Patents.

CERTIFICATE OF CORRECTION.

Patent No. 1,664,030.   Granted March 27, 1928, to

JAMES HARVEY GRAVELL.

It is hereby certified that error appears in the printed specification of the above numbered patent requiring correction as follows: Page 3, line 48, claim 7, strike out the word "independent" and insert the same before the word "work" in line 49; and that the said Letters Patent should be read with this correction therein that the same may conform to the record of the case in the Patent Office.

Signed and sealed this 1st day of May, A. D. 1928.

(Seal)

M. J. Moore,
Acting Commissioner of Patents.